US012755391B2

(12) United States Patent
Iglesias Navarro et al.

(10) Patent No.: US 12,755,391 B2
(45) Date of Patent: Oct. 6, 2026

(54) CROWD REMOVAL AND AUTOMATIC FOCUS FOR IMAGES

(71) Applicant: DISNEY ENTERPRISES, INC., Burbank, CA (US)

(72) Inventors: Santiago Iglesias Navarro, Palma de Mallorca (ES); Pablo Pernias Pascual de Pobil, San Juan de Alicante (ES); Robert B. Moore, Clermont, FL (US); David N. Juboor, Johnson City, TN (US)

(73) Assignee: Disney Enterprises, Inc., Burbank, CA (US)

( * ) Notice: Subject to any disclaimer, the term of this patent is extended or adjusted under 35 U.S.C. 154(b) by 274 days.

(21) Appl. No.: 18/437,878

(22) Filed: Feb. 9, 2024

(65) Prior Publication Data

US 2025/0259309 A1 Aug. 14, 2025

(51) Int. Cl.
*G06T 7/11* (2017.01)

(52) U.S. Cl.
CPC ...... *G06T 7/11* (2017.01); *G06T 2207/10028* (2013.01); *G06T 2207/30196* (2013.01)

(58) Field of Classification Search
CPC ............. G06T 7/11; G06T 2207/10028; G06T 2207/30196
See application file for complete search history.

(56) References Cited

U.S. PATENT DOCUMENTS

| | | | | |
|---|---|---|---|---|
| 10,929,655 | B2 * | 2/2021 | Sun | G06V 40/171 |
| 12,067,730 | B2 * | 8/2024 | Lin | G06V 10/25 |
| 2019/0164313 | A1 * | 5/2019 | Ma | G06N 7/00 |
| 2024/0013351 | A1 * | 1/2024 | Liu | H04N 5/2621 |
| 2024/0144520 | A1 * | 5/2024 | Gori | G06T 7/73 |
| 2024/0144623 | A1 * | 5/2024 | Gori | G06T 7/70 |
| 2024/0312251 | A1 * | 9/2024 | Jangid | G06T 7/10 |
| 2024/0422284 | A1 * | 12/2024 | Vanchinathan | H04N 23/632 |

* cited by examiner

*Primary Examiner* — Henok Shiferaw
*Assistant Examiner* — Urooj Fatima
(74) *Attorney, Agent, or Firm* — Dorsey & Whitney LLP

(57) ABSTRACT

A computer implemented method includes receiving, by a processor, an image including one or more subjects and one more obstructions. The method further includes partitioning, by the processor, the image into a plurality of image segments, where the one or more subjects and one or more obstructions are represented as separate image segments of the plurality of image segments. The method further includes obtaining, by the processor, depth information for the plurality of image segments. The method further includes identifying one or more focal image segments of the plurality of image segments based on the depth information of the plurality of image segments and modifying the image based on the one or more focal image segments to generate a modified image.

23 Claims, 7 Drawing Sheets

CROWD REMOVAL AND AUTOMATIC FOCUS FOR IMAGES

BACKGROUND

Often, people may capture images at a variety of densely packed locations, such as tourist attractions and theme parks. Such images may include the subjects of interest (e.g., a family) but also include many other people and objects that also are in the area at the time of the image capture. As such, it may be desirable to remove or replace unwanted people (e.g., crowd or strangers) or objects from the image. More specifically, certain environments that are commonly suitable for photography (such as amusement parks or other tourist attractions), the high volume of guests may make it difficult to take a portrait photo without any unwanted people or obstructions in the background. Thus, it may desirable after a photo is taken to determine the focal subject(s) of the image and remove any unwanted obstructions from the image. Additionally, obstruction removal may provide better user experience for commercial portrait photography by streamlining the editing process and providing for consistent image backgrounds.

Current methods for removing unwanted obstructions in images are manual and require a user to manually designate objects in the image that are undesirable and select the objects for removal. These methods are time-consuming and impractical where there are many obstructions in an image. For example, for an image with a large crowd of people obstructing the background, manual methods may require selection and removal of each person in the crowd. Further, such methods may also be time-consuming and resource intensive in aggregate where many images require obstruction removal. For example, where a commercial enterprise captures and distributes photos on a mass scale or where a tourist has accumulated a large album of vacation photos, it may be impractical to manually identify and remove obstructions from each image.

BRIEF SUMMARY

An example computer implemented method is disclosed herein. The method includes receiving, by a processor, an image including one or more subjects and one more obstructions. The method further includes partitioning, by the processor, the image into a plurality of image segments, where the one or more subjects and one or more obstructions are represented as separate image segments of the plurality of image segments. The method further includes obtaining, by the processor, depth information for the plurality of image segments. The method further includes identifying one or more focal image segments of the plurality of image segments based on the depth information of the plurality of image segments and modifying the image based on the one or more focal image segments to generate a modified image.

An example image editing system for automatic detection and editing of image obstructions is disclosed. The example system includes an image data storage comprising of a plurality of images and a processor configured to modify the plurality of images. The processor is configured to receive an image including one or more subjects and one or more obstructions. The processor is further configured to partition the image into a plurality of image segments, where the one or more subjects and one or more obstructions are represented as separate image segments of the plurality of image segments. The processor is further configured to obtain depth information for the plurality of image segments and identify one or more focal image segments of the plurality of image segments based on the depth information of the plurality of image segments. The processor is further configured to modify the image based on the one or more focal image segments to generate a modified image.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

The present disclosure includes a system to automatically detect unwanted obstructions in images and edit or remove those obstructions from the image. The system may generate image segments of objects within the image and a depth map of those segments. Based on the depth map, the system assigns one or more focal image segments, e.g., based on depth, size, and position of the segment within the image, which are segments likely to represent the intended subject or subjects of the image. The one or more focal image segments may include a focal point segment and/or a focal cluster of one or more segments identified in relation with the focal point segment. The system may then edit, remove, or otherwise modify the image based on the focal image segments, e.g., peripheral segments not included as a focal image segment are removed. Optionally, the background or other areas of the image where obstructions were removed may be backfilled or otherwise modified to create a modified image that includes desired background and other objects and the focal image segments, but removes the undesired obstructions.

The obstruction removal module may be accessible by existing operator systems and applications (e.g., computer systems) such that the system may easily scale for personal or commercial use. The system may function as a standalone system or be integrated statically or dynamically into existing software and systems. For example, the obstruction removal module may be embedded in a website or implemented as a module within a mobile application or software system. Additionally, the system may provide automatic obstruction removal for images of different types and formats.

Figure 1:
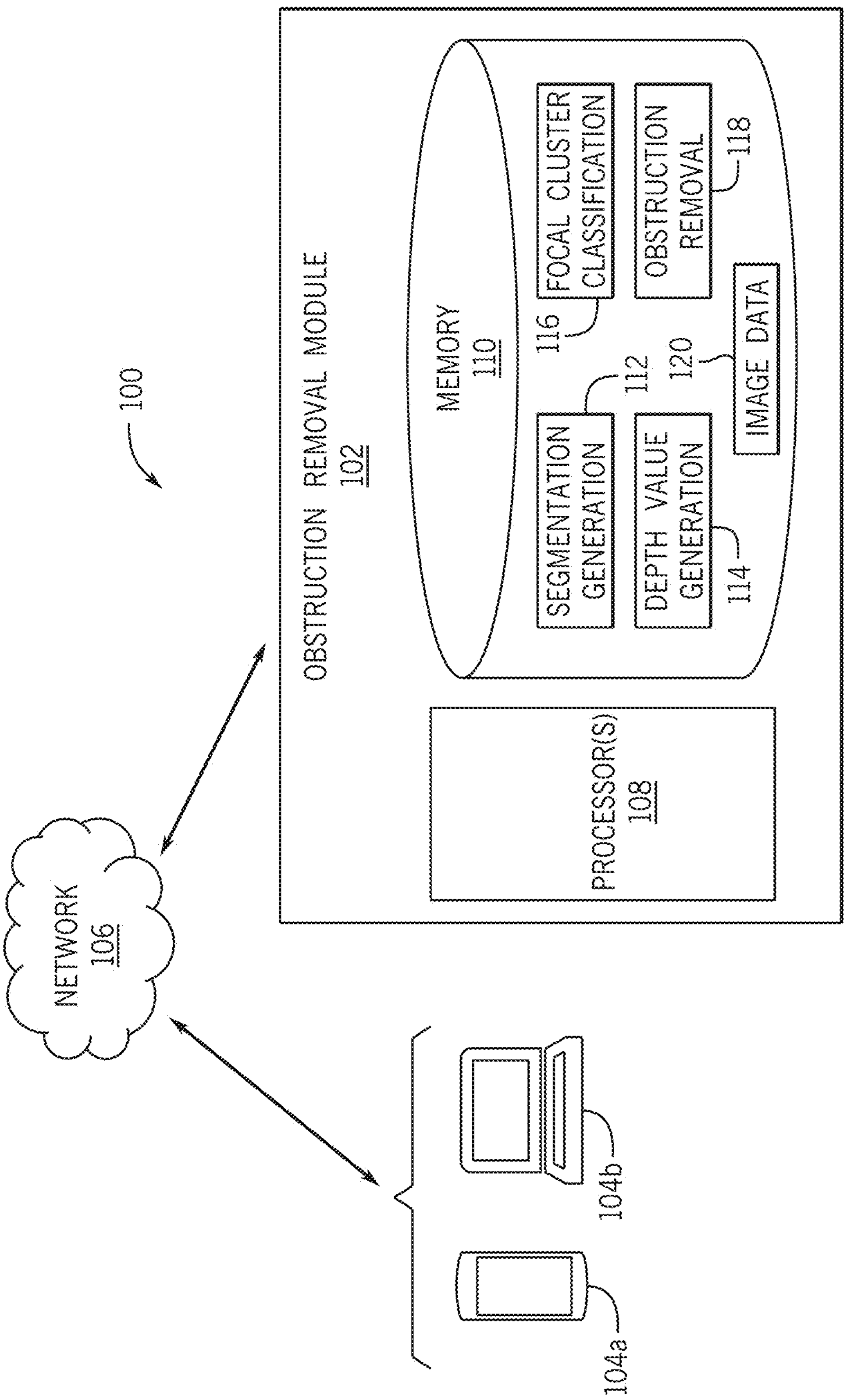
FIG. 1 illustrates an example system including user devices in communication with an obstruction removal module for removal of unwanted obstructions in images.

Various embodiments of the present disclosure will be explained below in detail with reference to the accompanying drawings. Other embodiments may be utilized, and structural, logical, and electrical changes may be made without departing from the scope of the present disclosure. Turning now to the drawings, FIG. 1 illustrates an example system including various devices 104*a* and 104*b* in communication with an obstruction removal module 102, where the obstruction removal module 102 detects and removes unwanted obstructions from images. The obstruction removal module 102 may be generally accessible by users through user devices 104*a* and/or 104*b* to automatically detect and remove any unwanted obstructions from images. In some examples, the obstruction removal module 102 may be accessible through a website or mobile application. In some examples, the obstruction removal module 102 may be associated with a photography service or editing platform.

The obstruction removal module 102 may generally be implemented by or at a computing device or combinations of computing resources in various embodiments. In various examples, the obstruction removal module 102 may be implemented by one or more servers, cloud computing resources, and/or other computing devices. The obstruction removal module 102 may, for example, be incorporated as a module within a mobile application, software application, or a website presented through a web browser (e.g., at a laptop or desktop computer), and the like.

In some examples, the user devices 104*a* and 104*b* may be devices belonging to an end user, such as a consumer or other entities or users accessing the obstruction removal module 102. For example, user devices 104*a* and/or 104*b* may be mobile devices or other computing devices used by a consumer or end customer to access the obstruction removal module 102. The user devices 104*a* and 104*b* may or may not have image capture capabilities. In other examples, the user devices 104*a* and 104*b* may be devices belonging to a photography service provider. For example, 104*a* and 104*b* may be handheld or computer devices used by personnel in the course of a photoshoot to provide photography and editing services.

In various implementations, the user devices 104*a* and 104*b* and/or additional user devices may be implemented using any number of computing devices including, but not limited to, a computer, a laptop, tablet, mobile phone, smart phone, wearable device (e.g., AR/VR headset, smart watch, smart glasses, or the like), smart speaker, vehicle (e.g., automobile), or appliance. Generally, the user devices may include one or more processors, such as a central processing unit (CPU) and/or graphics processing unit (GPU). The user devices may generally perform operations by executing executable instructions (e.g., software) using the processor (s). Though two user devices 104*a* and 104*b* are shown in FIG. 1, any number of user devices may be in communication with the obstruction removal module 102, in various examples.

The network 106 may be implemented using one or more of various systems and protocols for communications between computing devices. In various embodiments, the network 106 or various portions of the network 106 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like.

Although not shown in FIG. 1, the obstruction removal module 102 may be in communication with other systems or components. For example, the obstruction removal module 102 may communicate with image storage systems, image editing platforms, photography service systems, and the like. The obstruction removal module 102 may, for example, communicate with image storage systems to receive images from a database or to provide edited images to a database. In other examples, the obstruction removal module 102 may interface with an image editing platform to provide obstruction removal services to the platform.

FIG. 1 additionally illustrates a schematic diagram of an example obstruction removal module 102, in accordance to various examples provided herein. In various implementations, the obstruction removal module 102 may include or utilize one or more hosts or combinations of compute resources, which may be located, for example, at one or more servers, cloud computing platforms, computing clusters, and the like. Generally, the obstruction removal module 102 is implemented by compute resources including hardware for memory 110 and one or more processors 108. For example, the obstruction removal module 102 may utilize or include one or more processors, such as a CPU, GPU, and/or programmable or configurable logic. In some embodiments, various components of the obstruction removal module 102 may be distributed across various computing resources, such that components of the obstruction removal module 102 may communicate with one another through the network 106 or using other communications protocols. For example, in some embodiments, the obstruction removal module 102 may be implemented as a serverless service, where computing resources for various components of the obstruction removal module 102 may be located across various computing environments (e.g., cloud platforms) and may be reallocated dynamically and/or automatically according to, for example, resource usage of the obstruction removal module 102. In various implementations, the obstruction removal module 102 may be implemented using organizational processing constructs such as functions implemented by worker elements allocated with compute resources, containers, virtual machines, and the like.

The memory 110 may include instructions for various functions of the obstruction removal module 102 which, when executed by processor 108, perform various functions of the obstruction removal module 102. The memory 110 may further store data and/or instructions for retrieving data used by the obstruction removal module 102. Similar to the processor 108, memory resources utilized by the obstruction removal module 102 may be distributed across various physical computing devices. In some examples, memory 110 may access instructions and/or data from other devices or locations, and such instructions and/or data may be read into memory 110 to implement the obstruction removal module 102.

The memory 110 may include or access various types of data or instructions used by the obstruction removal module 102. While such data and instructions is shown in FIG. 1 as being stored at the memory 110, in some examples, the data and instructions may be stored at other memory resources of the obstruction removal module 102 and/or at locations remote from the obstruction removal module 102, such as various databases or data stores. In such examples, the memory 110 of the obstruction removal module 102 may include instructions for accessing such data and instructions from remote locations, including, for example, the locations of the data and/or specific queries used to retrieve data for use by the obstruction removal module 102. Such data and instructions may include segmentation generation 112, depth value generation 114, focal cluster classification 116, obstruction removal 118, and image data 120, in various examples.

In various examples, the memory 110 may include instructions for segmentation generation 112. Such instructions for segmentation generation 112 may, when executed by the processor 108, analyze an image to partition the image into one or more image segments. In some examples, a segment includes a subset of pixels in an image that are grouped by one or more common characteristics or classifications. For example, a segment may represent the subset of pixels that depicts a person in an image. In some examples, segmentation generation 112 may include image classification analysis, where objects in the image are classified into categories and segments may be partitioned based on the classifications. For example, segmentation generation 112 may be configured to generate segments in an image for objects classified as humans. In some examples, segments are grouped in a manner to reflect an intuitive classification of objects present in an image. For example, an image of a family standing next to a car may be partitioned into separate segments representing individual family members, the car, the road, and any background objects such as trees or a house.

In various examples, the memory 110 may include instructions for depth value generation 114. Such instructions for depth value generation 114 may, when executed by the processor 108, analyze an image to provide a depth map of the image and a subsequent average depth of the segments in an image to generate a depth value of the segments in the image. In some examples, the depth map provides a representation of the distance of objects in the image from the perspective of the camera or capture point. Utilizing the segments assigned by segmentation generation 112, depth value generation 114 calculates the average depth of the segments to form an average depth value for the segments.

In various examples, the memory 110 may include instructions for focal cluster classification 116. Such instructions for focal cluster classification 116 may, when executed by the processor 108, assign one or more focal image segments as the intended subjects of the image. In some examples, the focal cluster classification 116 may generate a segment score for the one or more segments in the image based on the average depth value, size, and position of the individual segments. The focal cluster classification 116 may then determine a focal point segment based on the segment scores and assign the focal point segment and nearby segments to a focal cluster, e.g., segments that are within a threshold based on pixel distance and pixel depth. The focal cluster classification 116 may also apply a positional threshold "safe zone" to the image, where segments positioned within the safe zone are included into the focal cluster. The threshold or safe zone may be determined based on a likelihood that the objects are part of the same "group," e.g., people standing directly next to each other may be part of the same focal point of the image, such as part of the same family. The threshold may vary based on the size of the image, number of clusters, and the like.

In various examples, the memory 110 may include instructions for obstruction removal 118. Such instructions for obstruction removal 118 may, when executed by the processor 109, remove, replace, and/or edit any obstructions in the image. For example, segments not in the focal cluster and not the intended subject of the image and may be classified as obstructions and removed from the image by obstruction removal 118. Obstruction removal 118 may implement a variety of methods for removing, replacing, or editing unwanted segments including, but not limited to, procedural methods, image masks, or machine learning methods. In some embodiments, the objects may be removed and then replaced or concealed via other image modification techniques, such as backfill or the like.

In various examples, the memory 110 may include image data 120, which may generally include data of the images modified by the obstruction removal module 102. Such data may include the pixel values of the image and data generated by segmentation generation 112, depth value generation 114, focal cluster classification 116, and obstruction removal 118. For example, segmentation generation 112 may assign groupings of pixels in the image to certain segments; the segment assignment of pixels may be stored in image data 120. Depth value generation 114 may then subsequently access the segment assignment of pixels in image data 120 to generate an average depth score for the segments based on the depth information of the pixels within the segment. The average depth scores may then be stored in image data 120 and subsequently accessed by focal cluster classification 116 to generate the focal cluster of segments.

The components shown in FIG. 1 are exemplary only. In various examples, the obstruction removal module 102 may communicate with and/or include additional components and/or functionality not shown in FIG. 1. For example, the obstruction removal module 102 may include separate components for communication with image editing services and/or image storage services.

Figure 2:
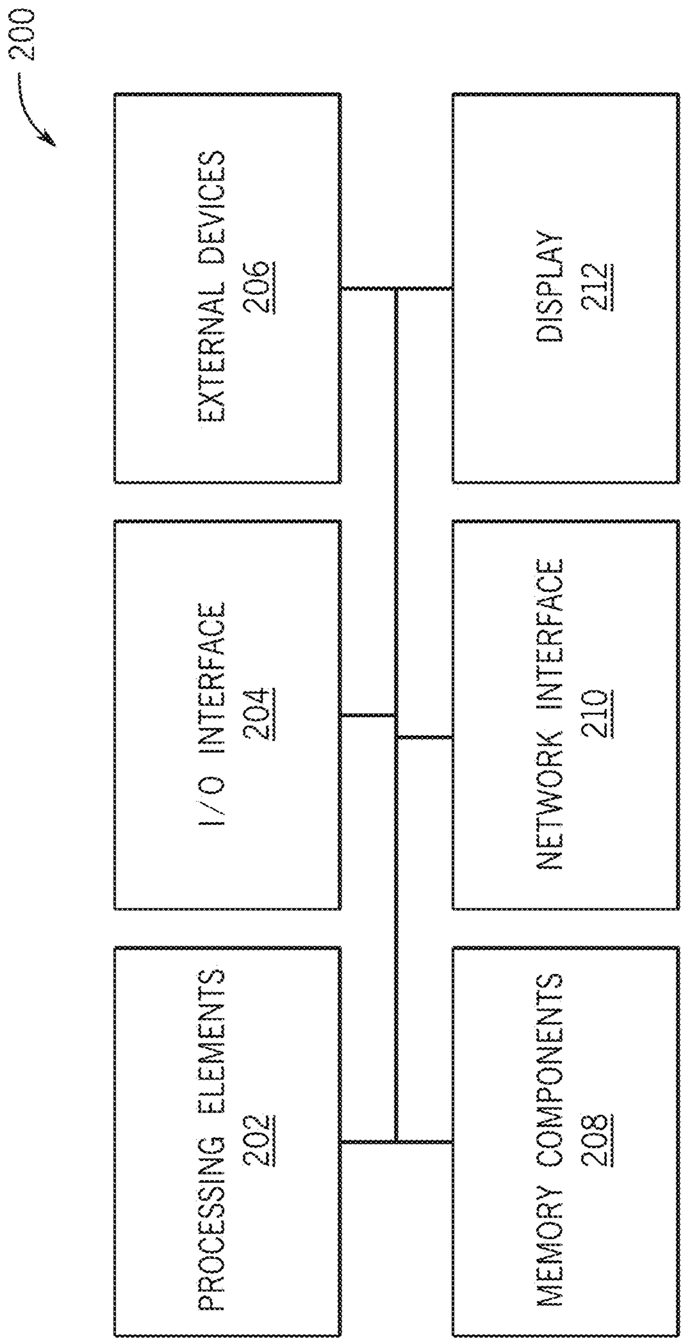
FIG. 2 illustrates a schematic diagram of an example computer system implementing various embodiments.

FIG. 2 is a schematic diagram of an example computing system 200 which may be used to implement various embodiments in the examples described herein. For example, processor 108 and memory 110 may be located at one or several computing systems 200. In various embodiments, user devices 104*a* and 104*b* are also implemented by a computing system 200. This disclosure contemplates any suitable number of computer systems 200. For example, the computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple machines; span multiple data centers; or reside in a cloud, which may include one or more cloud components in one or more networks. The computing system 200 may include one or more processing elements 202, an input/output (I/O) interface 204, one or more external devices 206, one or more memory components 208, and a network interface 210. Each of the various components may be in communication with one another through one or more buses or communication networks, such as wired or wireless networks.

The processing element 202 may be any type of electronic device capable of processing, receiving, and/or transmitting instructions. For example, the processing element 202 may be a central processing unit, microprocessor, processor, or microcontroller. Additionally, it should be noted that some components of the computing system 200 may be controlled by a first processor and other components may be controlled by a second processor, where the first and second processors may or may not be in communication with each other.

The I/O interface 204 allows a user to enter data in to computing system 200, as well as provides an input/output for the computing system 200 to communicate with other devices or services. The I/O interface 204 can include one or more input buttons, touch pads, and so on.

The external devices 206 are one or more devices that can be used to provide various inputs to the computing device 200, e.g., mouse, microphone, keyboard, trackpad, or the like. The external devices 206 may be local or remote and may vary as desired. In some examples, the external devices 206 may also include one or more additional sensors.

The memory components 208 are used by the computing system 200 to store instructions for the processing element 202, as well as store data, such as image data 120 (FIG. 1) and the like. The memory components 208 may be, for example, magneto-optical storage, read-only memory, random access memory, erasable programmable memory, flash memory, or a combination of one or more types of memory components.

The network interface 210 provides communication to and from the computing system 200 to other devices. The network interface 210 includes one or more communication protocols, such as, but not limited to WiFi, Ethernet, Bluetooth, and so on. The network interface 210 may also include one or more hardwired components, such as a Universal Serial Bus (USB) cable, or the like. The configuration of the network interface 210 depends on the types of communication desired and may be modified to communicate via WiFi, Bluetooth, and so on.

The display 212 provides a visual output for the computing devices and may be varied as needed based on the device. The display 212 may be configured to provide visual feedback to the user and may include a liquid crystal display screen, light emitting diode screen, plasma screen, or the like. In some examples, the display 212 may be configured to act as an input element for the user through touch feedback or the like.

The components in FIG. 2 are exemplary only. In various examples, the computing system 200 may include additional components and/or functionality not shown in FIG. 2.

Figure 3:
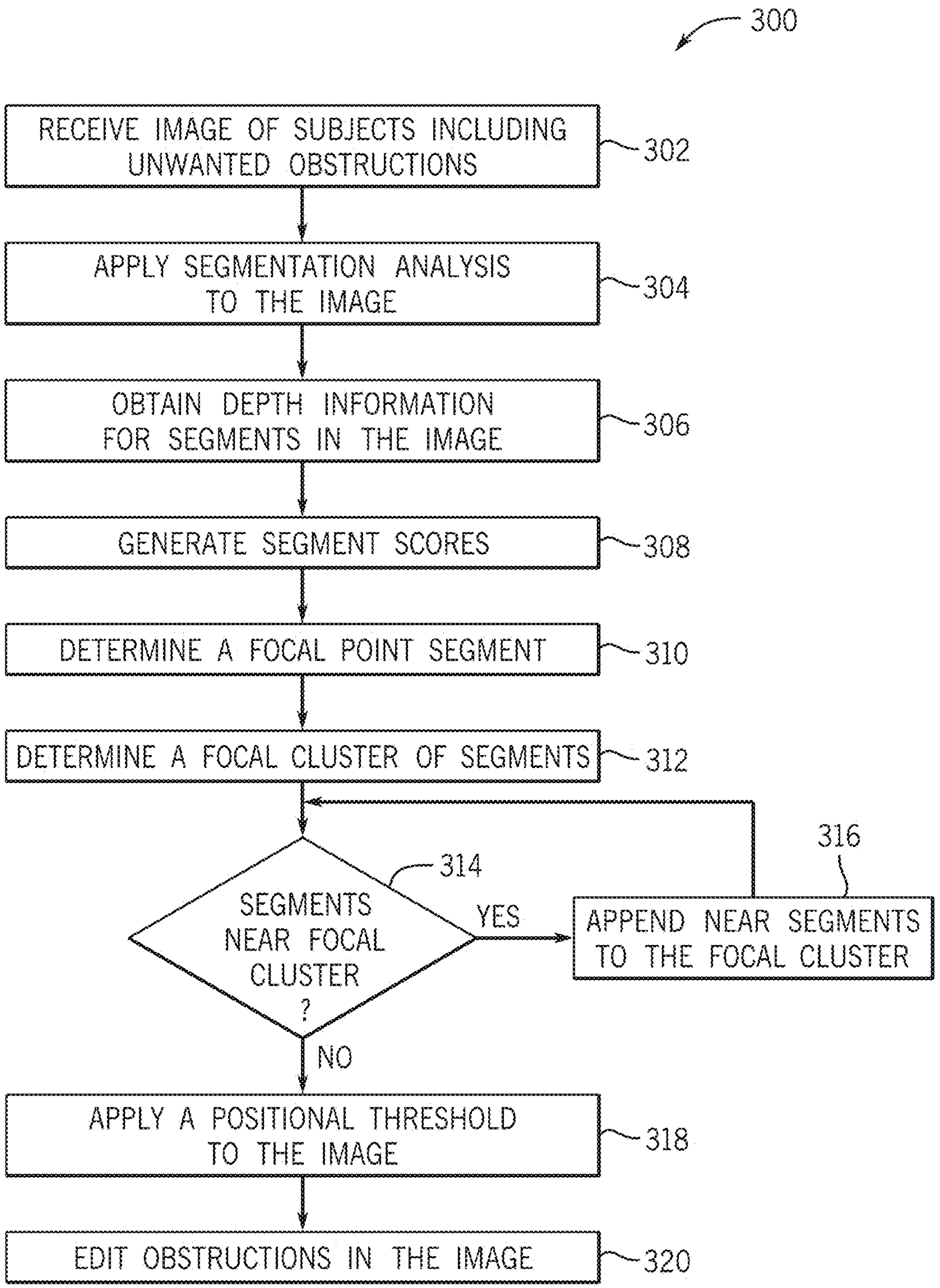
FIG. 3 is a flow diagram of example operations for detecting and removing unwanted obstructions from an image.

FIG. 3 is a flow diagram of a method to modify images, such as by using the obstruction removal module 102. At block 302, the obstruction removal module 102 receives an image for modification. For example, image 402 from FIG. 4 and image 502 from FIG. 5 represent example images received by the obstruction removal module 102.

The image includes one or more subjects and one or more obstructions. For example, subjects may be the intended focal point of the image and may include persons, animals, or other objects. That is, the subjects may be the focus area of the image, such as a person or persons posing in front of a scene or attraction. Obstructions are undesirable elements of the image that are not the subject and meant to be removed. Obstructions may include persons, animals, or other objects. For example, the image may be a group photo, where a group of individuals are the subject, and a crowd of people in the background are obstructions. In some examples, the image may be received from a user device 104*a* or 104*b*, a database, or other system in communication with the obstruction removal module 102. It should be noted that certain features, such as background features, may not be considered "obstructions" even though they are not representative of the subject as such features are meant to be included. For example, in some instances the technique may remove everything that is outside of the "subject" from the image, but in other instances, only certain types of obstructions, e.g., people, may be removed and background objects may be maintained.

The obstruction removal module 102 may also receive a request to edit, remove, or replace the obstruction. In some examples, the request may be received from a user device 104*a* or 104*b*, a database, or other system in communication with the obstruction removal module 102. For example, an end user may submit a request using user device 104*a* or 104*b* for the obstruction removal module 102 to detect and remove obstructions from an album of images. In other examples, the user may request that the obstruction removal module 102 edits the obstructions so that the background or other areas of the image where obstructions were removed may be backfilled or otherwise modified to create a modified image that includes desired background and other objects and the focal image segments, but removes the undesired obstructions. In some examples, the obstruction removal module 102 may remove or edit obstructions according to user preferences or settings. In other examples, the obstruction removal module 102 may identify the subjects and prompt the user for guidance on editing or removal of the one or more obstructions.

At block 304 of FIG. 3, the obstruction removal module 102 applies segmentation analysis to the image. In some examples, obstruction removal module 102 applies segmentation, such as through segmentation generation 112. Segmentation analysis partitions the image into one or more image segments, e.g., identifies groups of pixels that belong to discrete "segments" or that are likely to be representative of the same object. For example, a segment may include a set of pixels identified with one or more common characteristics or classifications. For example, a set of pixels may be identified to have characteristics of a class, e.g., a human, vehicle, or building, where the common characteristic is used to group the set of pixels as a segment. This operation may generate segments corresponding to the one or more subjects of the image and for the one or more unwanted obstructions in the image. For example, in a portrait photo, a segment may represent the subset of pixels that depicts the subject person of the image; further segments may represent the subset of pixels that depict background persons or objects that are obstructions in the image. In some examples, segmentation analysis may include classification analysis that applies corresponding labels to the segments. For example, segments may be labelled "adult person," "child," "stroller," and so on to reflect the person or objects represented in the segment. The image segments and classification may then be stored in image data 120.

Figure 4:
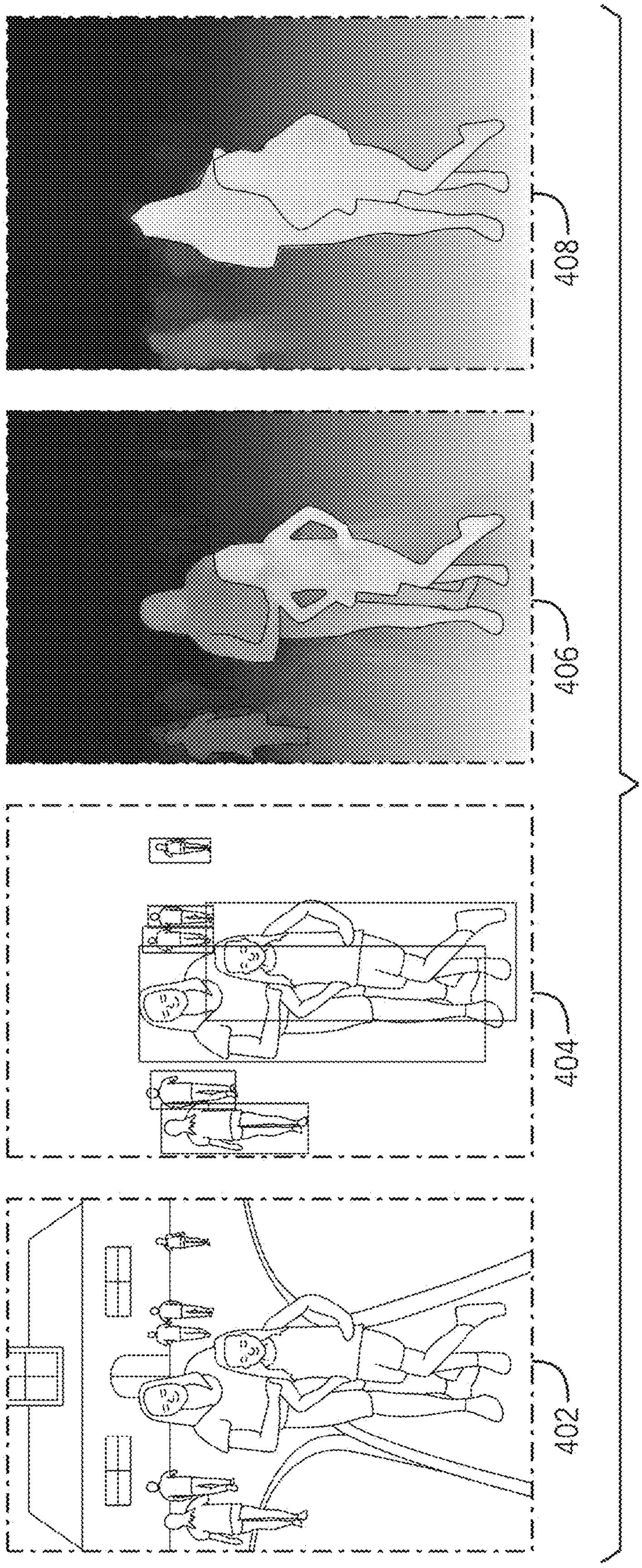
FIG. 4 shows example steps in the operations for generating segment scores for segments in the image.
Figure 5:
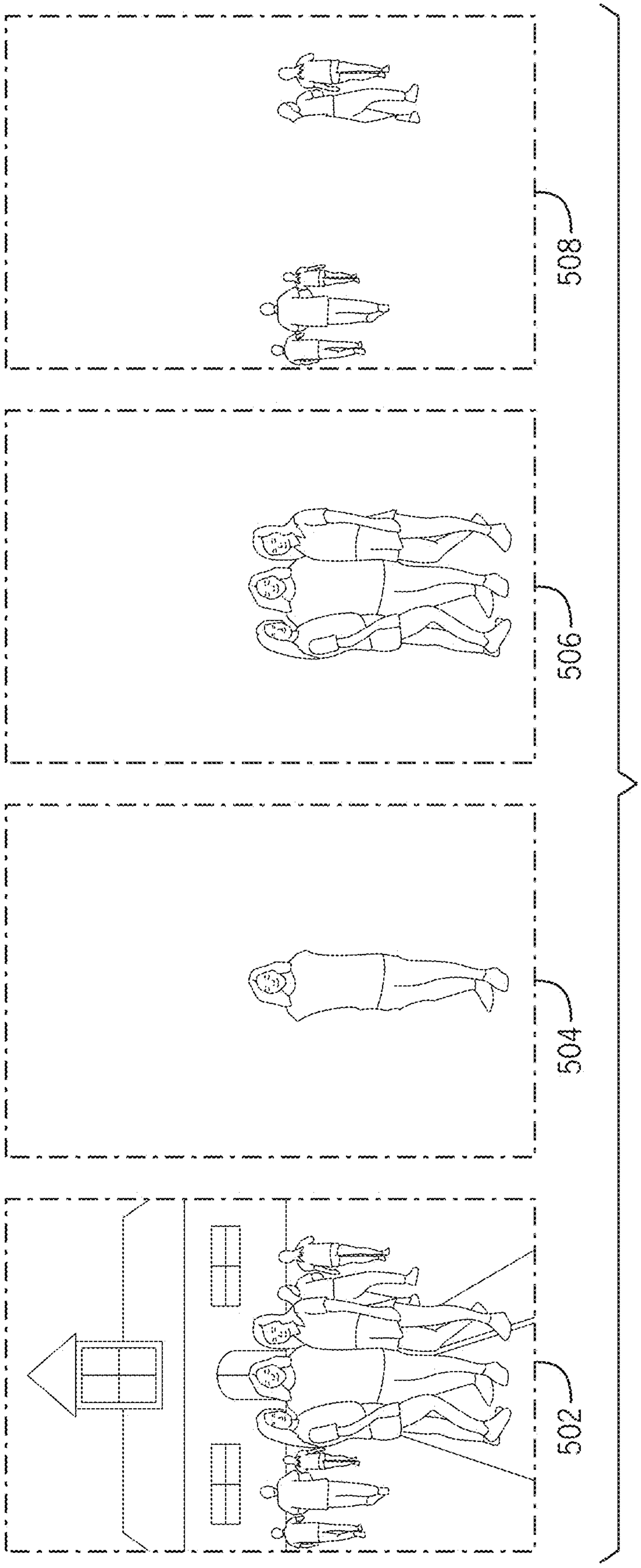
FIG. 5 shows example steps in the operations for assigning a best segment cluster in the image.

Image 404 of FIG. 4 portrays an example representation of the segmentation analysis 304 applied to image 402. In this example, the segmentation analysis identifies all segments classified as humans within the image 402. The segments are partitioned within the image, and designated by a rectangular bounding box. The portrayal of segments in image 402 is exemplary only. In various examples, segmentation analysis 304 may include different representations not shown in image 402. For example, segments may be represented by masks or outlines instead of a bounding box. Image 402 is meant to represent a visual portrayal of segmentation analysis 304. In various examples, segmentation analysis 304 may have no visual output or representations during the obstruction removal process.

In short, in the segmentation operation, pixels are identified and grouped together that are predicted to belong to a particular person, object, or the like. In some instances, segmentation analysis 304 may be implemented using computer vision or other machine learning techniques which may partition the image pixels into segments and label segments according to their applicable class, e.g., human, vehicle, building, foreground segment, or background segment.

At block 306 of FIG. 3, the obstruction removal module 102 obtains depth information for the image segments generated at block 304. In some examples, obstruction removal module 102 obtains depth information, such as through depth value generation 114. Depth information may include a depth map of the image and the average depth value of the one or more segments in the image. In some examples, the obstruction removal module 102 obtains depth information by first generating a depth map of the image which provides a representation of the distance of individual pixels from the perspective of the camera or capture point. The distance from the pixels to the camera or capture point may be considered the depth value of the pixel. The depth map pixels are then grouped according to the corresponding image segments retrieved from image data 120.

Image 406 of FIG. 4 illustrates an example representation of a depth map generated by operations 306. In the example depth map, the distance of objects in the image from the perspective of the camera is designated by a gradient, where a lighter shade represents a closer proximity to the camera and a darker shade represents a further proximity to the camera. In the example image 406, the depth map is partitioned according to the segments generated in image 404 such that the segments are represented by individual segment depth maps which contain depth information of the segment. In example image 406, the segments are outlined in black and include a depth map of the segment. The segment depth maps in the example image 406 contain multiple shades of the gradient since some body parts represented in the segments may be closer to the camera, and therefore at a different depth value, than others.

At block 306 of FIG. 3, the obstruction removal module 102 further determines an average of depth value of all pixels within a segment to obtain the average segment depth value. The average segment depth value represents the average depth of the whole segment from the perspective of the camera or image capture point. For example, in a portrait image of two people, the segment of the person standing closer to the camera will have a lower average depth than the segment of the person standing further from the camera. The depth information of the image may then be stored in image data 120.

For example, with reference to image 408 of FIG. 4 the average segment depth values generated from the example segment depth maps of image 406 are shown. In this example, the obstruction removal module 102 utilizes the segments from 404 and segment depth maps from 406 to calculate the average depth of individual segments in the image. Unlike in example image 406, segments are represented by a single shade instead of a gradient. The single gradient shade represents the average depth value across the whole segment. A lighter shade represents an average segment depth closer to the perspective of the camera and a darker shade represents an average segment depth further from the perspective of the camera.

The example portrayals in images 406 and 408 are exemplary only. In various examples, depth information may include different representations not shown in FIG. 4. For example, pixel depth may be represented by numerical values instead of a gradient. The images 406 and 408 are meant to represent visual portrayals of depth information operations of the obstruction removal module 102. In various examples, depth information may have no actual visual output or representation during the obstruction removal process.

At block 308 of FIG. 3, the obstruction removal module 102 generates segment scores for the segments based on the average depth value, size score, and position score of the segment within the image. In some examples, the segment score is a ranked numerical value, where segments that are more likely to be the subject of the image have a higher segment score and segments that are less likely to be the subject of the image have a lower segment score. In some examples, the segment score is a normalized value between zero and one. The average depth value may be the depth information generated at block 306 and retrieved from image data 120. The obstruction removal module 102 may generate a size score of a segment by comparing the size of the segment to the size of the image. For example, the obstruction removal module 102 generates a ratio comparing the total number of pixels in a segment to the total number of pixels in the image, where a segment with a higher ratio is assigned a higher size score and a segment with a lower ratio is assigned a lower size score. The obstruction removal module 102 may generate a position score of a segment by analyzing the position of the segment within the image. For example, the position score may be based on the position of the segment along the horizontal x-axis in the image, where a segment closer to the horizontal center of the image will be assigned a higher position score and a segment further from the horizontal center of the image will be assigned a lower position score.

The obstruction removal module 102 may assign a segment score for the segments in the image based on the segment's average depth value, size score, and position score. A lower average segment depth value, higher size score, and higher position score individually contribute to a higher segment score, while a higher average segment depth value, lower size score, and lower position score individually contribute to a lower segment score. For example, a segment that is close to the camera, large, and in the horizontal center of the image is more likely to be a subject of the image and will be assigned a higher segment score than a segment that is far from the camera, small, and away from the horizontal center of the image. In some examples, average depth value, size score, and position score may be afforded different weights in assigning the segment score. In other examples, the average depth value, size score, and position score may be afforded the same weight in assigning the segment score. The segment scores for the segments may then be stored in image data 120.

At block 310 of FIG. 3, the obstruction removal module 102 determines a focal point segment. Focal image segments represent the one or more segments likely to be intended for inclusion as the one or more subjects of the image. The focal image segments may include the focal point segment and/or a focal cluster of one or more segments. The focal point segment represents the segment most likely to be intended for inclusion as the one or more subjects of the image. The focal point segment may be determined based on the segment scores generated at block 308 and retrieved from image data 120. In some examples, the segment with the highest segment score in the image is assigned as the focal point segment. The focal point segment assignment may then be stored in image data 120.

Image 504 of FIG. 5 portrays an example representation of the focal point segment assigned from the image 502. The obstruction removal module 102 receives an example image 502 according to operations 302, where the image includes one or more subjects and one or more obstructions. In some examples, the obstruction removal module 102 assigns the segment with the highest segment score as the focal point segment, where the segment score is based on the average depth value, size, and position of the segment. For example, in image 502, the segment representing the woman in the middle of the image is assigned as the focal point segment in 504 because the segment is close to the camera and has a low average depth value, the segment is relatively large compared to the size of the image, and the segment is located in the horizontal center of the image. The focal point segment may represent the segment most likely to be intended for inclusion within the one or more subjects of the image.

At block 312 of FIG. 3, the obstruction removal module 102 determines an initial focal cluster of segments. The focal cluster of segments represents a group of one or more segments that are meant for inclusion as the subject of the image. The focal cluster of segments may be determined based on the focal point segment assigned at block 310 and retrieved from image data 120. In some examples, the focal point segment represents the segment most likely to be an intended subject of the image, and other segments close to the focal point segment in depth and position are likely to also be intended subjects of the image. In such examples, the obstruction removal module 102 assigns a focal cluster by searching segments that are near to the focal point segment in both average depth value and position to find segments above a threshold segment score set by the obstruction removal module 102. In some examples, the obstruction removal module 102 may determine whether a segment is near in average depth value and/or position to the focal point segment through a statically set depth and position range applied to the focal point segment. In other examples, the obstruction removal module 102 may determine whether a segment is near in average depth value based on the total range of depths present in the image. For example, a segment may be near to the focal point segment in average depth value if it is within 5% of the total depth change in the image.

From the set of near segments, the obstruction removal module 102 may compare the average depth value and/or position score of the near segments to a threshold average depth value and/or position score assigned by the obstruction removal module 102, where segments with an average depth value and/or position score above the threshold are assigned to the focal cluster of segments. In some examples, the obstruction removal module 102 may set the threshold statically, as a normalized standard across all images. For example, where position scores are normalized values between zero and one, the threshold position score may be statically set at 0.95 for all images. In other examples, the obstruction removal module 102 may set the threshold dynamically, based on the average depth value and/or position score of the focal point segment or based on the totality of the average depth values and or position scores in the image. For example, the threshold position score may be set at a value equivalent to 95% of the focal point segment's position score.

In some examples, where the focal point segment is small or classified as a seated person by the segmentation analysis, the focal cluster search may include segments in a wider range of average depth value and position or may require a lower threshold segment score. For example, where the focal point segment is a small child in a stroller or an individual seated in a wheelchair, other subjects of the image may be positioned behind the stroller or wheelchair. In such instances, the other subjects may not be as close in depth or position to the focal point segment as compared to instances where the focal point segment is not seated in a stroller or wheelchair. Therefore, in such examples, the obstruction removal module 102 may search for segments in a wider range of average depth value and position to find near segments, and may assign a lower threshold segment score for evaluating whether the near segment is to be assigned into the focal cluster of segments. In other examples, where the size of the focal cluster is relatively small in proportion to the entire image and the focal cluster includes individuals seated in strollers or wheelchairs, the obstruction removal module 102 may append a nearby segment to the focal cluster. The assignment of the focal cluster of segments may then be stored in image data 120.

In some examples, where there are no segments near to the focal point segment, the obstruction removal module 102 may not assign an initial focal cluster of one or more segments. In such examples, the set of focal image segments may only include the single focal point segment, or the initial focal cluster may include only the focal point segment as the single segment in the cluster.

Image 506 of FIG. 5 portrays an example representation of a focal cluster of segments as determined according to operations 312. In example image 506, the obstruction removal module 102 assigns a focal cluster of segments based on the focal point segment. The focal point segment and other segments which are near to the focal point segment in average depth value and position are assigned as the focal cluster of segments. In image 506, the focal point segment from image 504 and two additional segments from image 502 which are near to the focal point segment in average depth value and directly adjacent to the focal point segment are assigned as the focal cluster of segments.

Image 508 of FIG. 5 portrays an example representation of peripheral segments excluded from the focal cluster of segments. In some examples, the obstruction removal module 102 may designate the segments excluded from the set of focal image segments as peripheral segments. Peripheral segments may include obstructions to be edited, replaced, or removed according to operations 320. For example, image 508 portrays peripheral segments from image 502 that were not included as part of the focal cluster of segments of image 506. The peripheral segments from image 508 are not likely to be intended subjects of the image 502 and may be designated as obstructions.

The image portrayals in FIG. 5 are exemplary only. In various examples, the operations to determine a focal point segment and focal cluster of segments may include different representations not shown in FIG. 5. For example, segments may be represented by masks or outlines. The images in FIG. 5 are meant to represent visual portrayals of the operations to determine a focal point segment and focal cluster of segments. In various examples, the operations to determine a focal point segment and focal cluster of segments may have no actual visual output or representation.

At blocks 314 and 316 of FIG. 3, the obstruction removal module 102 iteratively appends near segments to the set of focal image segments to form a focal cluster of segments. An initial focal cluster of segments may be generated at block 312 and retrieved from image data 120. At block 314, the obstruction removal module 102 determines whether there are any segments near to the focal cluster of segments in average depth value or position. In some examples, the obstruction removal module 102 uses the maximum and minimum depth values of the focal cluster as upper bound and lower bound thresholds to search for near segments. For example, the obstruction removal module 102 may determine that there is a segment near the focal cluster if the segment has an average depth value greater than the minimum depth value in the current focal cluster and lower than the maximum depth value in the current focal cluster. In another example the removal may be based on a depth value close to a minimum depth utilizing a threshold and/or close to the maximum depth value utilizing a threshold.

In other examples, the lower and upper bound thresholds may be average depth values near the minimum and maximum depth values of the focal cluster. In such examples, the distance between the thresholds and the corresponding minimum or maximum focal cluster depth value may decrease upon each iteration of the 314 and 316 loop. For example, in a subsequent iteration of 314 and 316, the distance between the lower bound threshold and the minimum focal cluster depth value may be lower than the distance in previous iterations of 314 and 316.

In some examples, where an initial focal cluster of segments was not generated at block 312 and the set of focal image segments contain the single focal point segment, at block 314, the obstruction removal module 102 may instead assign the single focal point segment as the focal cluster and determine whether there are any segments near to the focal point segment in average depth value or position.

If the obstruction removal module 102 determines that there are one or more segments near the focal cluster, the obstruction removal module 102 proceeds to operation 316 to append the one or more segments onto the focal cluster and updates the focal cluster assignment in image data 120. The obstruction removal module 102 then proceeds back to operations 314 to search for segments near the new focal cluster, based on the depth value and position of the new focal cluster. In some examples, before the search the depth values and position of the focal cluster is adjusted to reflect the addition of the one or more segments. The obstruction removal module 102 continues to cycle through operations 314 and 316 until the obstruction removal module 102 determines that there are no segments near the focal cluster.

Figure 6:
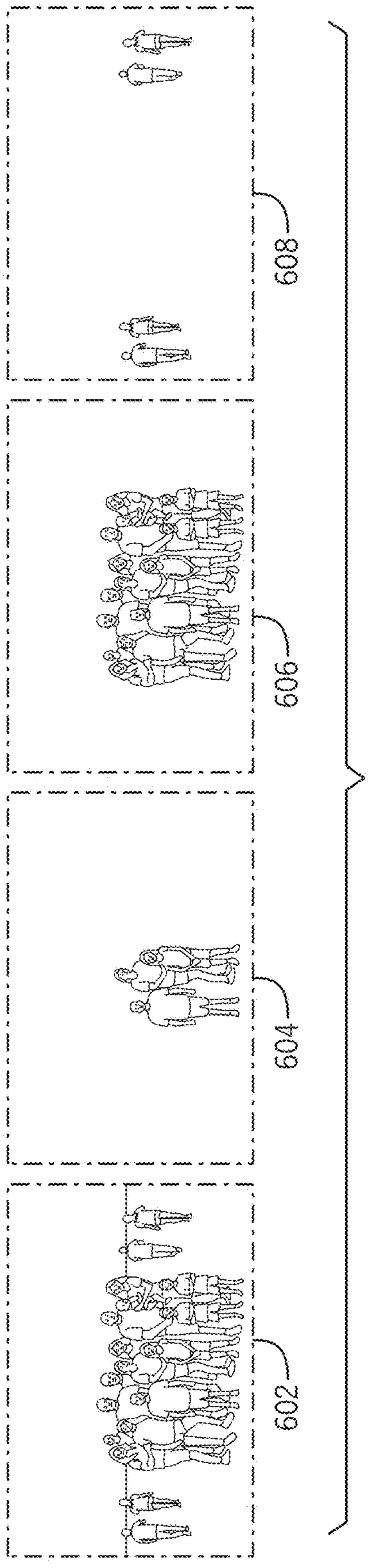
FIG. 6 shows example steps in the operations for assigning additional segments to the best segment cluster.

FIG. 6 shows example operations for iteratively appending segments to the focal cluster of segments according to operations 314 and 316 for an example image 602. The obstruction removal module 102 receives an example image 602 according to operations 302, where the image includes one or more subjects and one or more obstructions. Image 604 portrays an example representation of a focal cluster of segments designated from image 602 according to operations 312. For example, the focal cluster of segments shown in image 604 includes the focal point segment and two segments which are near to the focal point segment in average depth value and position. Segments in the focal cluster are likely intended as subjects of the image 602.

Image 606 portrays an example representation of segments which have been iteratively appended to the focal cluster of segments according to operations 314 and 316. In some examples, the obstruction removal module 102 searches for segments that are near the focal cluster in position and within the minimum and maximum depth value of the focal cluster. If the obstruction removal module 102 finds any such segments, the obstruction removal module 102 appends the segments to the focal cluster. The obstruction removal module 102 then adjusts the position and minimum and maximum depth of the focal cluster according to the new segments appended to the focal cluster. The obstruction removal module 102 then repeats the search until there are no segments near to the focal cluster in position and within the minimum and maximum depth value of the focal cluster. Since the appended segments are near to the focal cluster, and therefore grouped together, they are likely to be subjects of the image. For example, in image 606, a group of segments from image 602 are appended to the focal cluster from image 604 through the iterative cycle of searching for near segments. Although segments towards the outer edges of the group are not near to the focal point segment and would not have been initially included in the focal cluster according to operations 312, the iterative search of operations 314 and 316 gradually expands the focal cluster to include segments that may not be near the focal point segment but are in a group with the focal point segment and likely intended as a subject of the image.

Image 608 portrays an example representation of peripheral segments excluded from the focal cluster of segments. In some examples, once the iterative search of operations 314 and 316 no longer find any segments near to the focal cluster in position and within the minimum and maximum depth value of the focal cluster, segments not found in the search may be excluded from the focal cluster. In some examples, the obstruction removal module 102 may designate the segments excluded from the focal cluster as peripheral segments. Peripheral segments may include obstructions to be edited, replaced, or removed according to operations 320. For example, image 608 portrays peripheral segments from image 602 that were not included as part of the focal cluster of segments of image 606 through the iterative search. The segments from image 608 are not likely to be intended subjects of the image 602 and may be designated as obstructions.

The image portrayals in FIG. 6 are exemplary only. In various examples, the operations to append segments to the focal cluster of segments may include different representations not shown in FIG. 6. For example, segments may be represented by masks or outlines. The images in FIG. 6 are meant to represent visual portrayals of the operations to append segments to the focal cluster of segments. In various examples, the operations to append segments to the focal cluster of segments may have no actual visual output or representation.

At block 314 of FIG. 3, if the obstruction removal module 102 determines that there are no segments near the focal cluster, the obstruction removal module 102 proceeds to operations 318 without appending any segments to the focal cluster. At block 318, the obstruction removal module 102 applies a positional threshold to the image. In some examples, the positional threshold is a safe zone or buffer around a segment which designates an area of the image where some or all segments within the area are appended to the focal cluster of segments. For example, the obstruction removal module 102 may designate a safe zone in a rectangular area near the bottom middle of the image where strollers are frequently positioned in order to ensure that segments representing strollers within the safe zone are included in the focal cluster. The obstruction removal module 102 may then update the focal cluster assignment in image data 120. The operations 308-318 for assigning a focal cluster may be implemented by the obstruction removal module 102, such as through focal cluster classification 116.

Figure 7:
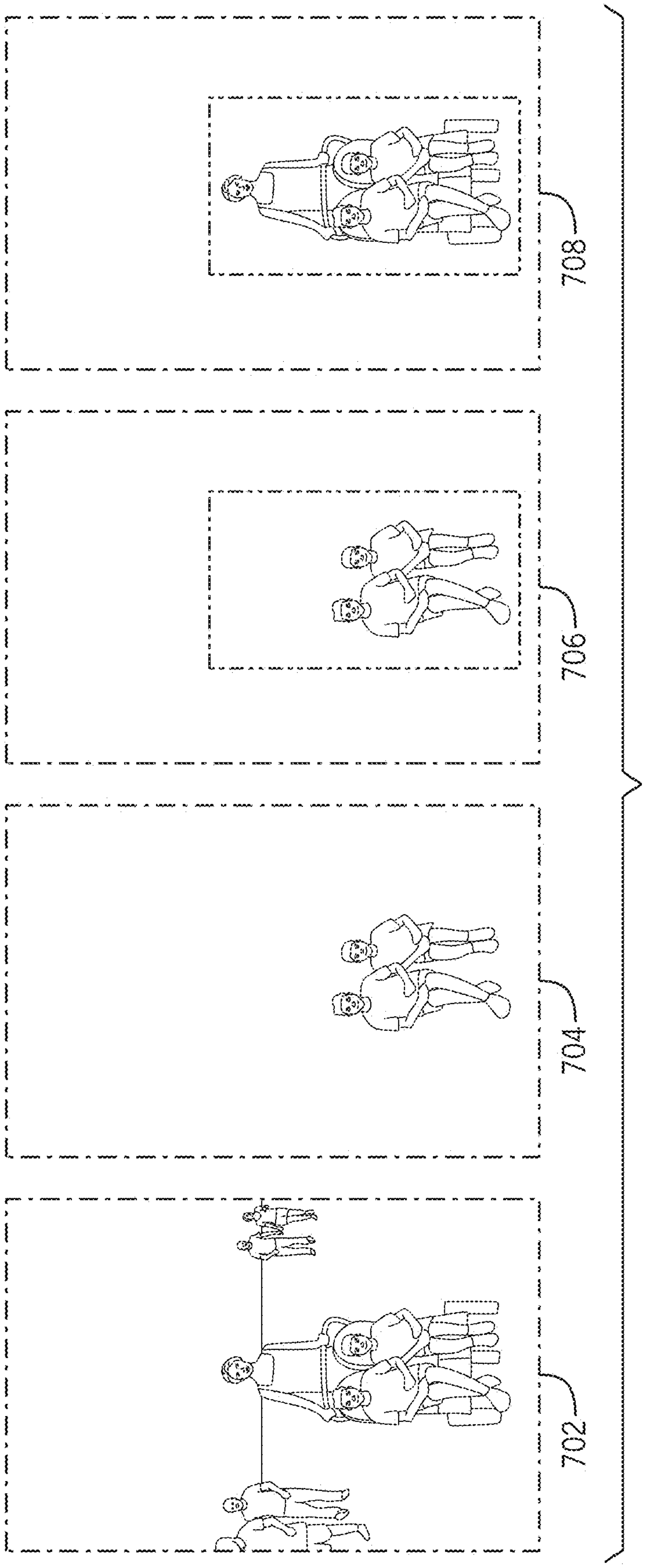
FIG. 7 shows example steps for designating a positional threshold in the image.

FIG. 7 shows example operations for designating a safe zone as a positional threshold in an example image 702. The obstruction removal module 102 receives an example image 602 according to operations 302, where the image includes one or more subjects and one or more obstructions. Image 704 portrays an example representation of a focal cluster of segments designated from image 702 according to operations 310-316. For example, the two segments in image 704 may be designated as focal cluster after an iterative search has found that no other segments are near the focal cluster in position and within the maximum and minimum depth value of the focal cluster. In the example image 704, the segment representing the woman is not included in the focal cluster because the segment is positioned behind the two segments representing the children and thus has a average depth value which is higher than the maximum depth value of the focal cluster.

Image 706 portrays an example representation of a positional threshold. In some examples, the obstruction removal module 102 applies a safe zone to the image as a positional threshold according to operations 318. A safe zone may be applied to an area of the image to ensure that segments intended as subjects of the image are appended to the focal cluster of segments. In some examples, the obstruction removal module 102 may designate a safe zone in an area of the image where subjects are often positioned. In some examples, the obstruction removal module 102 may designate a safe zone in an area of the image surrounding subject segments who are seated, e.g. in strollers or wheelchairs, to include segments that may be positioned behind the seated subjects. For example, in image 706, the obstruction removal module 102 has designated a rectangular safe zone in the image. The safe zone is in the horizontal center and lower portion of the image, where subjects of an image are often positioned. The safe zone is also positioned around the two segments in the focal cluster since the two segments are seated children.

Image 708 portrays an example representation of segments appended to the focal cluster due to the safe zone. In some examples, the obstruction removal module 102 appends all segments within the safe zone to the focal cluster according to operations 318. In other examples, the segments in the safe zone are only appended to the focal cluster if the segments are above a threshold segment score or within a depth and position range of the focal cluster. For example in image 708, segments from image 702 which were not originally included in the focal cluster but within the safe zone designated in image 706 are appended to the focal cluster and are likely intended subjects of image 702. The appended segments, which include both the representation of the woman and the stroller are positioned within the safe zone and appended to the focal cluster.

The image portrayals in FIG. 7 are exemplary only. In various examples, the operations to designate a safe zone may include different representations or have different characteristics not shown in FIG. 7. For example, segments may be represented by masks or outlines. As another example, safe zones may not be rectangular and may vary in shape, including non-polygonal shapes. The images in FIG. 7 are meant to represent visual portrayals of the operations to designate a safe zone. In various examples, the operations to designate a safe zone may have no actual visual output or representation.

At block 320, the obstruction removal module 102 edits the obstructions in the image. The obstruction removal module 102 may designate a segment as an obstruction based on the classification of the segment and whether the segment is a focal image segment, e.g., whether the segment was assigned to the focal cluster. Segments excluded from the set of focal image segments are designated as peripheral segments. In some examples, peripheral segments that are classified as representing humans may be designated as obstructions. Segments may be classified as representing humans during segmentation analysis 304, through comparison of the segments to human shapes, or analyzing the segments with AI models. In other examples, all peripheral segments within a determined depth range may be designated as obstructions regardless of the classification of the segment. The obstruction depth range may extend from the maximum depth of the focal cluster to the minimum depth of a background feature intended for inclusion in the image. In such examples, any segment behind the focal cluster of subjects and in front of a background feature is designated as an obstruction. Designation of a segment as a background feature may be determined through image classification during segmentation analysis, comparing the segment shape to shapes of known background features, or other such means. The obstruction removal module 102 may then edit the image to remove or replace the obstructions in the image. The obstruction removal module 102 may implement the image editing operations, such as through obstruction removal 118.

Accordingly, the obstruction removal module 102 described herein addresses particular challenges and needs presented by photography services. For example, photographs taken in public contexts may often contain numerous obstructions obscuring the intended subjects and backgrounds of the image. Manually identifying and editing the obstructions may be time and resource prohibitive, especially where there are many such photographs that require editing. The obstruction removal module may automatically identify the subjects and obstructions of an image and may automatically edit the image to remove or replace the obstructions, streamlining the editing process. The obstruction removal module 102 accordingly provides for an improved image editing experience for users, reduces the manual decision-making load for users, and makes the image editing process more efficient.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A computer implemented method comprising:

- receiving, by a processor, an image including one or more subjects and one or more obstructions;
- partitioning, by the processor, the image into a plurality of image segments, wherein combinations of the one or more subjects and the one or more obstructions are represented as separate image segments of the plurality of image segments;
- obtaining, by the processor, depth information for the plurality of image segments;
- determining a segment score of each of the plurality of image segments based on the depth information, an image segment size, and an image segment position of the plurality of image segments, wherein the segment score comprises a ranked numerical value associated with the one or more subjects and the one or more obstructions;
- automatically identifying one or more focal image segments of the plurality of image segments based on the segment score of each of the plurality of image segments; and
- modifying the image based on the one or more focal image segments to generate a modified image.

2. The method of claim 1, wherein partitioning the image into the plurality of image segments further comprises classifying the plurality of image segments into two or more categories.

3. The method of claim 1, wherein the depth information comprises an average depth of each of the plurality of image segments from a perspective of a capture viewpoint of the image.

4. The method of claim 3, wherein a lower average depth of an image segment contributes towards a higher segment score for the image segment.

5. The method of claim 1, wherein a larger image segment size of an image segment relative to a size of the image contributes towards a higher segment score for the image segment.

6. The method of claim 1, wherein a closer proximity of an image segment to a horizontal center of the image contributes towards a higher segment score for the image segment.

7. The method of claim 1, wherein the one or more focal image segments include a focal cluster of at least two image segments.

8. The method of claim 7, further comprising:

- assigning an image segment with a highest segment score as a focal point segment; and
- assigning the focal cluster based on the depth information and the image segment position of image segments relative to the focal point segment.

9. The method of claim 8, wherein assigning the focal cluster based on the depth information and the image segment position of image segments relative to the focal point segment comprises assigning an initial focal cluster of segments, wherein the initial focal cluster of segments includes the focal point segment and other segments that are within a threshold image depth and image distance from the focal point segment and have an average image depth and an average image segment position value above a threshold average image depth and a threshold average image segment position value.

10. The method of claim 8, wherein assigning the focal cluster further comprises:

- identifying image segments that are within a threshold distance from the focal cluster and within a minimum and maximum depth range of the focal cluster of segments;
- appending the image segments to the focal cluster; and
- repeating the identification and addition of image segments with new depth information and position information of the focal cluster until no image segments are found within the threshold distance and the minimum and maximum depth range.

11. The method of claim 8, wherein assigning a focal cluster further comprises assigning a positional threshold in the image, wherein image segments positioned within the positional threshold are appended to the focal cluster.

12. The method of claim 1, further comprising assigning an image segment with a highest segment score as a focal point segment.

13. The method of claim 1, wherein the plurality of image segments comprise the one or more focal image segments and one or more peripheral segments and modifying the image based on the focal image segments comprises removing at least one of the one or more peripheral segments from the image.

14. An image editing system for automatic detection and editing of image obstructions, comprising:

- an image data storage comprising a plurality of images; and
- a processor configured to modify the plurality of images, wherein the processor is configured to:
  - receive an image including one or more subjects and one or more obstructions;
  - partition the image into a plurality of image segments, wherein combinations of the one or more subjects and the one or more obstructions are represented as separate image segments of the plurality of image segments;
  - obtain depth information for the plurality of image segments, wherein the depth information comprises an average depth value of each of the plurality of image segments;
  - generate a segment score of each of the plurality of image segments based on the average depth value of each of the plurality of image segments, a size of each of the plurality of image segments, and a position of each of the plurality of image segments, wherein the segment score comprises a ranked numerical value associated with the one or more subjects and the one or more obstructions;

automatically identify one or more focal image segments of the plurality of image segments based on the segment score of each of the plurality of image segments; and modify the image based on the one or more focal image segments to generate a modified image.

15. The system of claim 14, wherein the processor is further configured to classify the plurality of image segments into two or more categories.

16. The system of claim 14, wherein the obtaining depth information for the plurality of image segments includes obtaining the average depth value of each of the plurality of image segments.

17. The system of claim 14, wherein the processor is further configured to:

assign a focal point segment of the image based on the segment score of each of the plurality of image segments;

assign a focal cluster of segments based on the average depth value of each of the plurality of image segments and the position of each of the plurality of image segments relative to the focal point segment;

append image segments to the focal cluster of segments based on the average depth value of each of the plurality of image segments and the position of each of the plurality of image segments relative to the focal cluster of segments; and assign a positional threshold in the image, wherein image segments located within the positional threshold are appended to the focal cluster of segments.

18. The system of claim 17, wherein a lower average depth value of an image segment contributes towards generating a higher segment score for the image segment.

19. The system of claim 17, wherein a larger size of an image segment relative to a size of the image contributes towards generating a higher segment score for the image segment.

20. The system of claim 17, wherein a closer proximity of an image segment to a horizontal center of the image contributes towards generating a higher segment score for the image segment.

21. The system of claim 17, wherein an image segment with a highest segment score is assigned as the focal point segment.

22. The system of claim 17, wherein assigning the focal cluster of segments based on the depth and position of image segments relative to the focal point segment comprises assigning an initial focal cluster of segments, wherein the initial focal cluster of segments includes the focal point segment and other segments that are within a threshold depth and distance from the focal point segment and have an average depth and position score above a threshold average depth and position score.

23. The system of claim 22, wherein assigning the focal cluster of segments further comprises:

identifying image segments that are within a threshold distance from the focal cluster of segments and within a minimum and maximum depth range of the focal cluster of segments;

appending the image segments to the focal cluster of segments; and repeating the identification and addition of image segments with a new depth and position information of the focal cluster of segments until no image segments are found within the threshold distance and the minimum and maximum depth range.

* * * * *